UNITED STATES PATENT OFFICE.

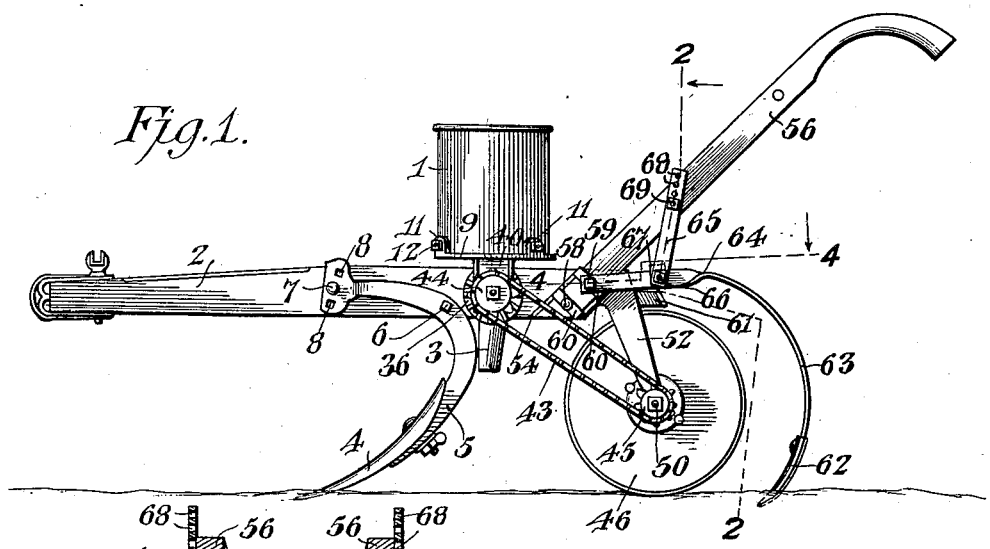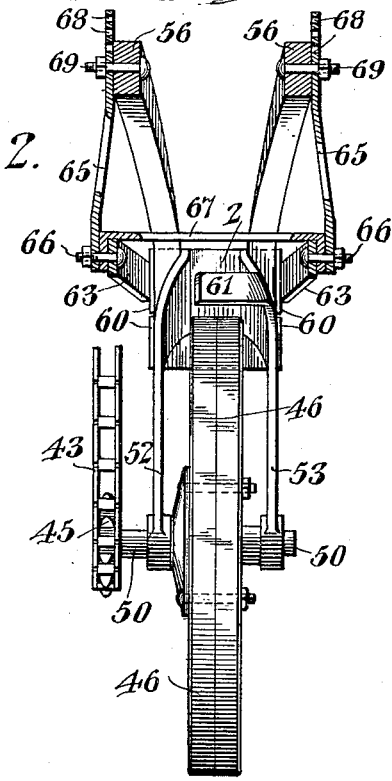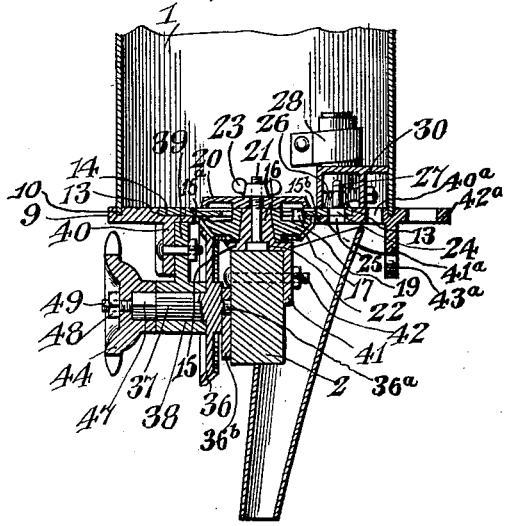

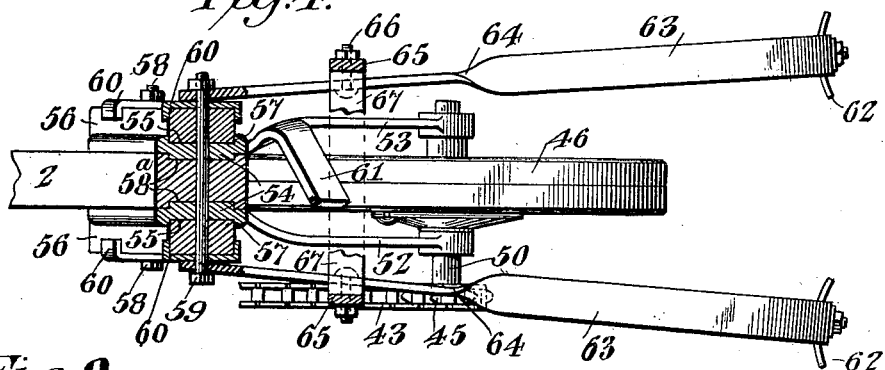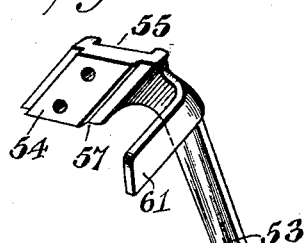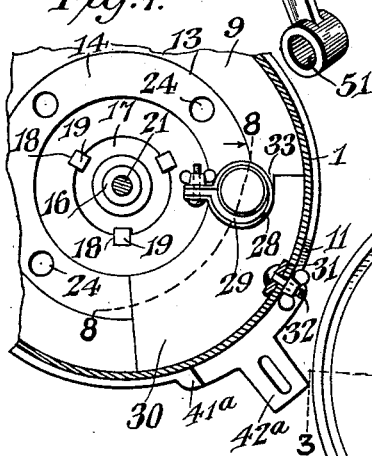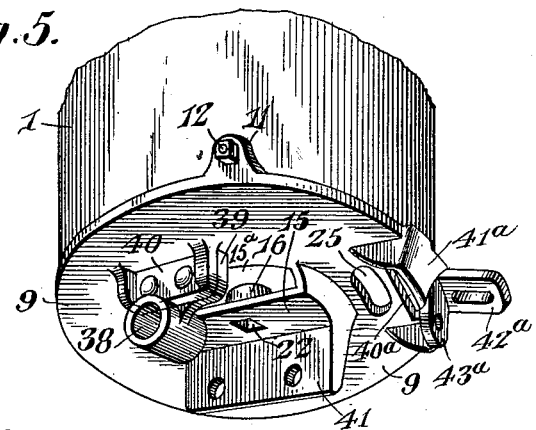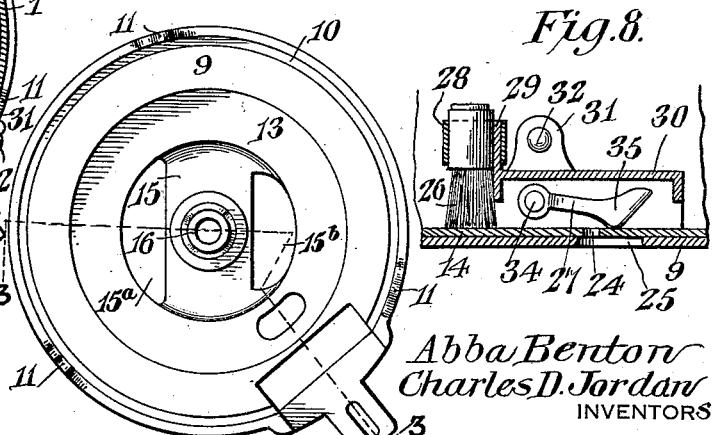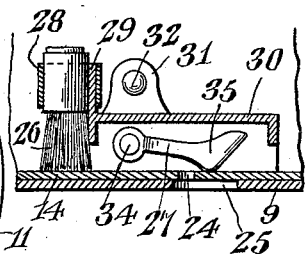

ABBA BENTON AND CHARLES D. JORDAN, OF MONTICELLO, GEORGIA.

PLANTER.

1,096,217.  Specification of Letters Patent.  Patented May 12, 1914.

Application filed December 7, 1912. Serial No. 735,564.

*To all whom it may concern:*

Be it known that we, ABBA BENTON and CHARLES D. JORDAN, citizens of the United States, residing at Monticello, in the county of Jasper and State of Georgia, have invented a new and useful Planter, of which the following is a specification.

The invention relates to improvements in planters.

The object of the present invention is to improve the construction of planters, and to provide a simple, inexpensive and efficient planter adapted to be mounted on an ordinary plow or cultivator beam and capable of opening, planting and covering seed and of being readily changed to enable it to be employed for various kinds of seed.

A further object of the invention is to provide a planter of this character capable of easy operation on either straight or crooked rows, and adapted to insure a proper and positive discharge of seed and equipped with covering blades or feet capable of adjustment to cover the seed either light or heavy.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a planter, constructed in accordance with this invention. Fig. 2 is a transverse sectional view on the line 2—2 of Fig. 1. Fig. 3 is a similar view on the line 3—3 of Fig. 6. Fig. 4 is a horizontal sectional view on the line 4—4 of Fig. 1. Fig. 5 is a detail perspective view of the lower portion of the hopper. Fig. 6 is a plan view of the bottom of the hopper. Fig. 7 is a plan view of a portion of the hopper. Fig. 8 is a sectional view on the line 8—8 of Fig. 7. Fig. 9 is a detail perspective view of the supporting bar having the scraper.

Like numerals of reference designate corresponding parts in all the figures of the drawings.

In the accompanying drawings in which is illustrated the preferred embodiment of the invention, 1 designates a seed box or hopper mounted on a wooden plow beam 2 over a seed spout 3, arranged to discharge seed in rear of a furrow opening blade 4 and suitably secured to the seed box or hopper. Instead, however, of employing a wooden plow or cultivator beam, an ordinary metallic beam of this character may be used. The furrow opening blade 4, which may be of any preferred construction, is secured to a curved standard 5, pivoted at its upper portion at 6 at a point intermediate of its ends to the beam 2 and adjustably secured at the front end of its upper portion to the beam by means of a bolt 7, adapted to be arranged in any one of a plurality of perforations 8. The seed spout 3 is suitably secured to the beam 2 at one side thereof and it depends below the same in position to discharge the seed into the furrow opening by the blade 4.

The hopper 1, which is preferably cylindrical, is composed of a body portion of sheet metal or other suitable material and a circular bottom plate 9, preferably consisting of a single casting and provided at its upper face adjacent to its periphery with an annular groove 10 to receive the lower edge of the sheet metal body portion of the hopper and having upwardly extending ears 11, secured to the outer face of the body portion of the hopper by bolts 12, or other suitable fastening devices. The bottom plate or bottom of the hopper is provided at an intermediate point with an annular recess 13 to receive a rotary seed disk 14, and it has a central depressed portion 15 provided with an integral upwardly extending tubular journal 16 on which is mounted a central horizontal bevel gear 17. The rotary seed disk is provided with a central opening and it has a series of notches 18, arranged at spaced points at the edges of the opening and receiving projecting studs 19 of the central horizontal bevel gear 17. The rotary seed disk is detachably retained in place in its interlocked relation with the bevel gear by means of a cap plate 20, secured to the tubular journal by a vertical bolt 21, passing through the tubular journal and having a squared head at its lower end to fit a rectangular recess 22 in the lower face of the central depressed portion of the bottom of the hopper. The threaded portion of the bolt extends above the cap plate 20 and is equipped with a thumb nut 23, adapted to be readily screwed on or off the bolt to permit the seed disk to be changed. The seed disk is provided at its peripheral portion with apertures 24, arranged at intervals to suit the character of the seed to be planted, and adapted to be successively brought into register with a discharge opening 25 in the bottom of the hopper over the seed spout 3. In practice the planter is designed to be equipped with a number of interchangeable seed disks having apertures varying in size and number to suit various kinds of seed and adapted to permit the planter to be easily and quickly arranged for planting the desired kind of seed.

A proper and positive discharge of seed is assured by means of a brush 26 and a weighted lever 27. The brush 26 is arranged above the path of movement of the apertures of the seed disk, and in the rotary movement of the latter the apertures are carried beneath the brush, which prevents more than the proper amount of seed being carried to the discharge opening of the bottom of the hopper. The brush is secured by a clamping collar 28 to an upwardly extending flange 29, located at one end of a curved casing or support 30, which is arranged at the inner face of one side of the body portion of the hopper. The curved casing or support, which is provided at the flange with a recess 33 to receive the brush, is composed of a horizontal top wall or portion and spaced depending side walls, and it is provided with an upwardly extending ear 31, secured to the body portion of the hopper by a bolt 32, or other suitable fastening device.

The seed is positively dislodged from the apertures of the seed disk by means of the weighted lever 27, pivoted at one end by a bolt 34 to the inner face of the outer side wall of the support or casing 30 and having its other end 35 enlarged and presenting a rounded projecting portion to the seed disk. The rounded projecting portion of the weighted lever is located above the discharge opening in the bottom of the hopper and it rests upon the seed disk and drops into the seed apertures thereof.

No claim is made in the present application to the means for mounting the brush and the weighted lever.

The bottom of the hopper is provided at opposite sides of the depressed portion 15 with openings $15^a$ and $15^b$, and below the opening $15^a$ is mounted a vertically disposed beveled gear 36, which meshes with the horizontal gear 17 for rotating the seed slide. The vertical beveled gear is provided with a short integral shaft 37 extending outwardly and mounted in a bearing opening 38 of a bearing bracket or hanger 39, and the said gear 36 is also provided at the inner side with an integral trunnion $36^a$, which is journaled in a bearing plate $36^b$, secured to the adjacent side face of the beam 2. The bearing bracket or hanger 39 is bolted or otherwise secured to a vertical flange 40 depending from and formed integral with the bottom plate of the hopper, and the bearing opening 38 is preferably formed by a sleeve, as clearly illustrated in Fig. 5 of the drawings. The bottom of the hopper is also provided at one side of the central depressed portion with an integral depending vertical attaching flange 41, secured to the beam 2 at one of the side faces thereof by spaced horizontal bolts 42, or other suitable fastening devices. The lower face of the central depressed portion of the bottom of the hopper is flat and is seated upon the upper edge or face of the beam 2, as clearly shown in Fig. 3 of the drawings. The bottom of the hopper is provided beyond the aperture 25 with the slot $40^a$ and surrounded at the outer side by an approximately U-shaped boss or flange $41^a$ from which extend ears $42^a$ and $43^a$. The ear $42^a$ projects horizontally at one of the side edges of the bottom of the hopper, and the vertical ear $43^a$ depends from the flange at the inner end of the horizontal ear $42^a$. The approximately U-shaped boss or flange 41 with the ears $42^a$ and $43^a$ constitute supporting means for a separate feeding or seed dropping mechanism, and no claim is made for such construction in the present application.

The seed dropping mechanism is actuated by a chain drive consisting of a sprocket chain 43 and upper and lower sprocket wheels 44 and 45, but any other form of mechanism may be employed for transmitting motion from a ground wheel 46 to the seed dropping mechanism. The upper sprocket wheel 44 is secured on a squared portion 47 of the shaft 37 by a nut 48, which engages a reduced threaded outer terminal portion 49 of the shaft 37. The lower sprocket wheel is suitably fixed to one end of an axle 50 on which the ground wheel 46 is mounted.

The axle 50 is journaled in bearing openings 51 at the lower ends of a pair of inclined bars or members 52 and 53, extending downwardly and rearwardly from the rear end of the beam and provided at their upper ends with integral heads or plates 54 having inclined recesses 55 in their outer faces to receive the lower ends of a pair of handles 56. The inner faces of the heads or plates 54 are grooved at the front and rear edges at 57 to form an inwardly projecting portion, which is let into recesses 58ª in the side faces of the beam 2. By the particular construction of the heads or plates of the inclined supporting bars or members 52 and 53, they are interlocked with both the beam and the handles. The lower ends of the handles are secured to the beam by transverse bolts 58 and 59, piercing the handles, the plates or heads and the plow beam and also securing clamping plates 60 to the outer faces of the handles. The clamping plates 60 extend across the outer faces of the handles and have inturned terminals, which brace the front and rear edges of the said handles.

The ground wheel rolls in the furrow and presses the seed into the soil and assists the germination of the seed. The bar or member 53 is provided at its upper portion with a scraper 61 consisting of an arm formed integral with the supporting bar or member 53 and extending rearwardly at an angle and arranged in an approximately horizontal position above the ground wheel. No claim is made in the present application to the scraper construction.

The seed is covered by a pair of blades or feet 62, secured at the lower end of the curved standard 63 provided intermediate of their ends with quarter bends 64 to arrange their front portions flat against the handles. The upper front portions of the standard 63 are straight and approximately horizontal, and the rear portions of the standards 63 extend downwardly and rearwardly from the front portions and support the covering blades or feet in rear of the ground wheel and at opposite sides of the planter. The front ends of the standards 63 are pivoted to the handles by the bolt 59, and they are adjustably connected with the handles by means of upwardly extending bars or braces 65, secured at their lower ends to the approximately horizontal upper portions of the standards by bolts 66, which also fasten a transverse spacing bar or brace 67 to the said standards 63. The upper portions of the adjusting bars or braces 65 are provided at intervals with perforations 68 for the reception of bolts 69, piercing the handles and adapted to be arranged in any of the perforations to raise and lower the covering blades or feet to adjust the same to cover either light or heavy. The transverse spacing bar or brace 67 extends across the space between the front portions of the standards 63, and has its terminals bent downwardly and secured between the adjusting bars or braces and the standards 63.

What is claimed is:—

1. A planter of the class described including a beam, a hopper having a bottom provided with a depressed central portion seated upon the upper edge of the beam and provided with a depending attaching flange secured to the side face of the beam, a gear mounted in the depressed portion of the bottom of the hopper, a rotary seed disk arranged upon the bottom of the hopper and connected with the gear, and means for rotating the gear.

2. A planter of the class described including a beam, a hopper having a bottom provided with a depressed central portion seated upon the beam and having a depending portion secured to the side face of the beam, said depressed portion being also provided at its upper face with a journal, a gear arranged in the depressed portion of the bottom and mounted on the journal, a seed disk arranged upon the bottom of the hopper and connected with the gear, and means for operating the gear.

3. A planter of the class described including a hopper provided with a bottom having a central depressed portion adapted to be seated upon a beam, and provided at one side with a depending attaching flange, said bottom being also provided at the opposite side of the depressed portion with a depending supporting flange, a bearing supported by the latter, a horizontal gear wheel arranged within the depressed portion of the bottom of the hopper, a seed disk arranged upon the bottom of the hopper and connected with the said gear, and a vertical gear journaled in the said bearing and meshing with the horizontal gear.

4. A planter of the class described including a hopper having a bottom provided with a central depressed portion having an upwardly projecting tubular journal, said depressed portion being adapted to be seated upon a beam and having a depending attaching flange, a gear arranged in the depressed portion of the bottom and mounted on the tubular journal, a seed disk located at the upper face of the bottom of the hopper and connected with a gear, a cap plate supported by the journal, and a bolt extending through the journal and having a head at its lower end interlocked with the depressed portion of the bottom, and a nut arranged at the upper end of the bolt and detachably securing the cap plate thereon.

5. A planter of the class described including a beam, a hopper having a bottom provided with a depressed central portion seated upon the upper edge of the beam and having a depending attaching flange, a horizontal gear arranged in the depressed portion of the bottom, a seed disk connected with the gear, a hanger secured to the bottom of the hopper and spaced from the said depressed portion and having a bearing opening, a bearing plate mounted on the beam and having a bearing opening alined with the bearing opening of the hanger, and a vertical gear meshing with the horizontal gear and provided at its inner side with a trunnion arranged in the opening of the vertical plate, said vertical gear being provided at its outer side with an integral shaft mounted in the bearing opening of the hanger.

In testimony, that we claim the foregoing as our own, we have hereto affixed our signatures in the presence of two witnesses.

ABBA BENTON.
CHARLES D. JORDAN.

Witnesses:
W. B. MALONE,
M. P. STONE.

Copies of this patent may be obtained for five cents each, by addressing the "Commissioner of Patents, Washington, D. C."